United States Patent [19]

Stemmle

[11] Patent Number: 5,032,922
[45] Date of Patent: Jul. 16, 1991

[54] PLATEN ACCESSORY FOR PORTABLE COPIER

[75] Inventor: Denis J. Stemmle, Webster, N.Y.

[73] Assignee: Xerox Corporation, Stamford, Conn.

[21] Appl. No.: 547,275

[22] Filed: Jul. 2, 1990

[51] Int. Cl.⁵ .............. H04N 1/23; H04N 1/024; H04N 1/04

[52] U.S. Cl. .................. 358/296; 358/497; 358/401; 358/472

[58] Field of Search .......... 358/296, 300, 302, 401, 358/472, 473, 476, 494, 497; 382/59; 355/75, 65, 66, 230, 235

[56] References Cited

U.S. PATENT DOCUMENTS

| | | |
|---|---|---|
| 3,132,810 | 5/1964 | Olstensen . |
| 3,475,164 | 5/1969 | Browning . |
| 3,589,244 | 9/1968 | Murgus et al. . |
| 4,424,524 | 1/1984 | Danule ........................... 358/401 |
| 4,486,786 | 12/1984 | Sato ................................ 358/497 |
| 4,496,984 | 1/1985 | Stoffel ........................... 358/296 |
| 4,583,126 | 4/1986 | Stoffel ........................... 358/401 |

Primary Examiner—Bruce A. Reynolds
Assistant Examiner—Scott A. Rogers

[57] ABSTRACT

A reproducing apparatus includes a portable imaging platen and a self contained portable copier not having a platen but having a scanning carriage adapted for scanning movement having a reading head for scanning a document to produce a digital image and a printing head for printing a digital image on a copy sheet. The portable platen includes a pair of parallel copier transport rails mounted to a transparent document support member defining a portable copier transport path across the document support member. The rails have a drive surface and the portable copier is mounted on the rails and has a drive mechanism for transporting the portable copier along the drive surface of the rails.

27 Claims, 13 Drawing Sheets

PLATEN ACCESSORY FOR PORTABLE COPIER

CROSS REFERENCE TO RELATED APPLICATIONS

Attention is directed to my copending application Ser. No. 07/257,366 entitled Simultaneous Read/Write Copier filed Oct. 13, 1988, now U.S. Pat. No. 4,920,421 issued Apr. 24, 1990. Attention is also directed to copending application Ser. No. 07/547,887 (D/89102) entitled Compact Multimode Input and Output Scanner; Ser. No. 07/547,264 (D/89395) entitled Compact Read/Write Scanner; and Ser. No. 07/547,272 (D/89399) entitled Scanner with Document and Copy Sheet Registration Means; all filed concurrently herewith and commonly assigned.

BACKGROUND OF THE INVENTION

The present invention relates to a very low cost portable compact scanner. More particularly it is directed to a detachable portable platen accessory for use with a portable compact scanner copier which will enable copying from books and magazines.

Historically, copies of original documents have been produced by a xerographic process wherein the original document to be copied is placed on a transparent platen, either by hand or automatically through the use of a document handler, and the original document illuminated by a relatively high intensity light. Image rays reflected from the illuminated document are focused by a suitable optical system onto a previously charged photoconductor, the image light rays functioning to discharge the photoconductor in accordance with the image content of the original to produce an electrostatic latent image of the original on the photoconductor. The electrostatic latent image so produced is thereafter developed by a suitable developer material commonly referred to as toner, and the developed image transferred to a sheet of copy paper brought forward by a suitable feeder. The transferred image is thereafter fixed to the copy paper by fusing to provide a permanent copy while the photoconductor is cleaned of residual developer preparatory to recharging. More recently, interest has arisen in electronic imaging where, in contrast to the aforedescribed xerographic system, the image of the document original is converted to electrical signals or pixels and these signals, which may be processed, transmitted over long distances, and/or stored, are used to produce one or more copies. In such an electronic imaging system, rather than focusing the light image onto a photoreceptor for purposes of discharging a charged surface prior to xerographic development, the optical system focuses the image rays reflected from the document original onto the image reading array which serves to convert the image rays to electrical signals. These signals are used to create an image by some means such as operating a laser beam to discharge a xerographic photoreceptor, or by operating some direct marking system such as an ink jet or thermal transfer printing system.

It is generally advantageous if the normally separate document reading and copy printing operations could be combined. If some of these reading/writing functions could be combined, system operation and synchronization could be simplified and system cost reduced through the use of fewer parts.

There are systems in the prior art that address the above identified concerns. For example:

U.S. Pat. No. 4,496,984 to Stoffel and U.S. Pat. No. 4,583,126, a division of the above-identified reference, disclose an input/output scanner for simultaneously reading a document and writing a copy. The document and copy sheet are fed in back to back relation to the read/write station. A monolithic full width reading array reads each line in two steps, to improve resolution. The writing array consists of rows of ink jet nozzles, of which the number and disposition is in direct correspondence to the sensors of the read bar.

U.S. Pat. No. 4,424,524 to Daniele discloses a full width read/write LED array for scanning a document in the read mode or exposing the photoreceptor in the write mode. A Selfoc optical fiber lens array is used for focusing the full width LED array on the document or photoreceptor.

A difficulty with these prior art systems is the complexity and cost of separate components such as the complex optics, photoreceptor and developer in a typical xerographic process such as the Daniele system. In other systems such as the Stoffel system, it is necessary for an operator to manually combine a document and copy sheet into a single unit for manual insertion to the machine feed rolls. Such a system also has a significant cost penalty associated with components such as the monolithic full width reading array.

The copier concepts described in the last three cross referenced copending applications are attempts to reduce cost and complexity of such a copier while at the same time maximizing compactness and portability. In normal operation of the copier concept described in the last three cross referenced copending applications the top cover is opened the copy paper inserted in the lower slot, the document registered against the tab on the top cover. When the top cover is closed the copying sequence is initiated. The scan head moves across both the document and copy paper simultaneously reading a band of information (about 0.64") from the document and printing it on the copy paper. After each scan the document and copy paper drive rolls make one complete revolution which advances both the document and the copy paper 0.64" in opposite directions. The scan carriage then sweeps across the document and copy paper in the opposite direction to read and print the next band of information. These concepts have the limitation in that they are capable of handling only cut sheet documents. This can put a severe limitation on the range of applicable utilities for this portable copier by the user. Since it is not capable of not making copies from books and magazines on the spot. The present application is directed to a solution to the difficulty and in particular is directed to providing a detachable portable platen for use with a portable copier which will enable the copying from books and magazines.

PRIOR ART

U.S. Pat. No. 3,588,244 to Murgas et al. discloses a book copier attachment for a photocopy machine which includes a frame and a carrier means for movement within the frame. The attachment is used on a copier having a rapid sheet copying position and a book copying position. See FIGS. 1-3.

U.S. Pat. No. 3,445,164 to Browning discloses a portable copying machine having a rigid member having a surface of a size coextensive with copy paper. The rigid member can be a platform on which copy paper is laid, or a transparent member placed upon the paper in which internal light reflections are conducted. The copier is capable of copying large objects such as maps and books.

U.S. Pat. No. 3,132,810 to Ostensen discloses a photographic illumination device which may be used to copy pages from a book as well as sheets of paper. See FIGS. 3-4 which show light box 24, wedge attachment 16 for supporting and allowing light to expose photosensitive paper 12, and original 10 which may be a sheet or a book.

SUMMARY OF THE INVENTION

The present invention is directed to a platen accessory for a portable copier not having a platen which has a pair of parallel copier transport rails mounted to a transparent document support member. The rails have a drive surface for engagement with a drive mechanism on the portable copier to transport the copier along the drive surface.

In a further aspect of the present invention the drive surface is on the bottom of the transport rails and the document support member is supported by legs of sufficient length that the portable copier can be freely transported along the drive surface on the bottom of the rails.

In a further aspect of the present invention the portable copier is mounted for movement in a pair of parallel grooves one in each of the parallel transport rails.

In a further aspect of the present invention the platen accessory has a longitudinal cover adjacent each of the transport rails to cover portions of the portable copier when inserted therein and to support the portable copier as it is transported along its transport path. The cover may be of one piece or may be of two pieces including a first top cover to cover the top portions of the portable copier to minimize interference with a document on the document support member being reproduced and further includes copier support member such as rails.

In a further aspect of the present invention reproducing apparatus comprising a portable imaging platen and a self contained portable copier not having a platen is provided. The self contained portable copier includes a scanning carriage adapted for scanning movement and having a reading head secured thereto for scanning a document to produce a digital image and a printing head secured thereto for printing the digital image on a copy sheet. The portable copier is movably mounted on the index rails of the imaging platen and has a drive mechanism for transporting the portable copier along the drive surface of the transport rails.

In a further aspect of the present invention the portable copier has inboard and outboard sides adjacent the transport rails and is urged into driving engagement with a drive surface of the rails by means of leaf spring clips around each of the inboard outboard sides of the copier which are supported in longitude grooves on the transport rails.

In a further aspect of the present invention the portable copier has a biasing means such as a spring loaded idler roll on each of its inboard and outboard sides to urge it upwardly in to driving engagement with the drive surface of the copier transport rails.

In a further aspect of the present invention the scanning carriage is movably mounted in a copier frame assembly for scanning movement in a first direction between the inboard and outboard sides of the frame assembly including a copy sheet transport path including means to index a copy sheet in a set copy sheet path in a direction transverse to the first direction and means to index comprising a pair of synchronously driven rotatable drive rolls forming a feeding nip with a copy sheet idler roll and an indexing nip with said drive surface of the indexing rails.

In a further aspect of the present invention the reading head scans a band of information across the document on the document support member and the printing head simultaneously prints the same band of information across the copy sheet and upon completion of the scanning movement the transport means indexes the copy sheet and the portable copier in their respective paths a distance equal to the width of the band of information before the carriage scans another band of information across the document.

BRIEF DESCRIPTION OF THE DRAWINGS

For a better understanding of the present invention reference is had to the accompanied drawings wherein the reference numerals have been applied to the same parts in several figures.

DESCRIPTION OF PREFERRED EMBODIMENT

Figure 6A:
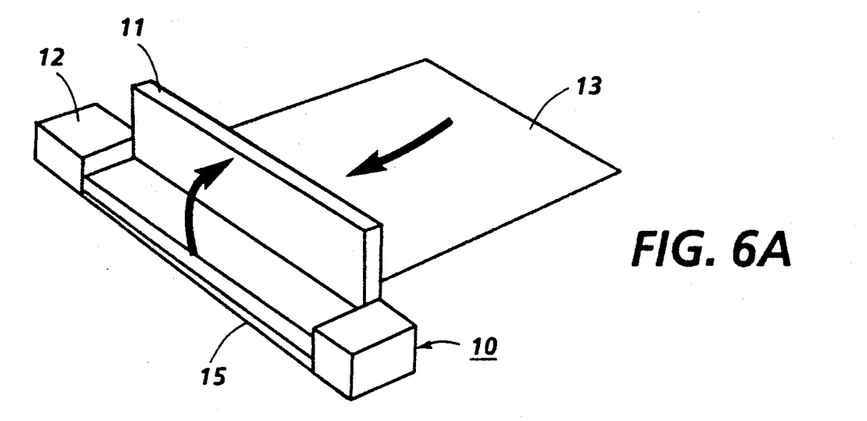
FIGS. 6A, 6B, and 6C are three isometric views illustrating the general operation of the compact copier.
Figure 6B:
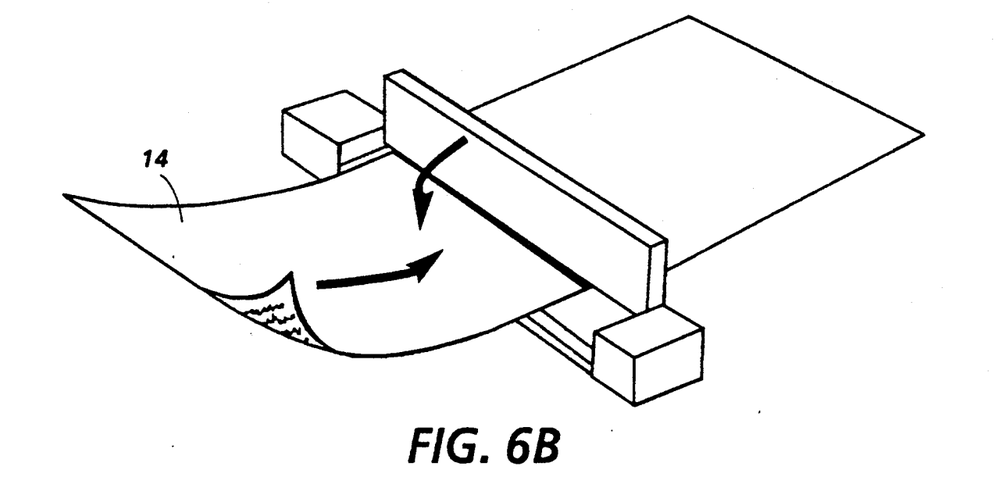
Figure 6C:
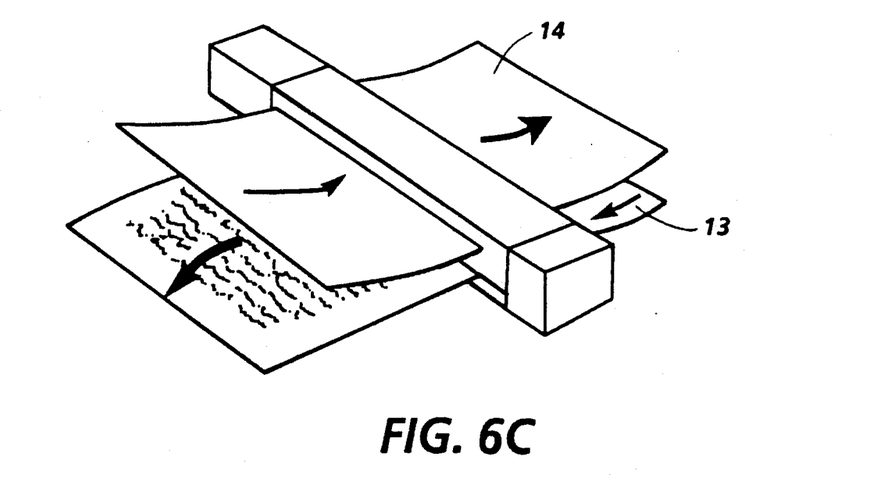

Referring now to FIGS. 6A, 6B and 6C a general overview of the compact portable copier according to the present invention is provided. The copier is generally illustrated as comprising a frame assembly 15 having a maintenance station 12 at one end and a top cover 11 pivotally mounted to the frame assembly. To make a copy of document 14 the top cover is rotated to the open position as shown in FIG. 6A, copy sheet 13 is inserted at the entrance of the copy sheet transport path and the document 14 is inserted against a registration stop member in the top cover after which the top cover is closed and the copying sequence begins by the scanning carriage scanning a band of information across the document. During the scanning operation the image on the document is digitized by an input digitizing system and in the preferred embodiment a digital image is essentially simultaneously printed by a printing system on the copy sheet. Subsequently, the document is indexed to the right and the copy sheet is indexed to the left to enable the scanning carriage to scan a second band of information in the reverse scanning direction across the document. The distance of the indexing of both the document and copy sheet is the width of the band of information across the document.

Figure 1:
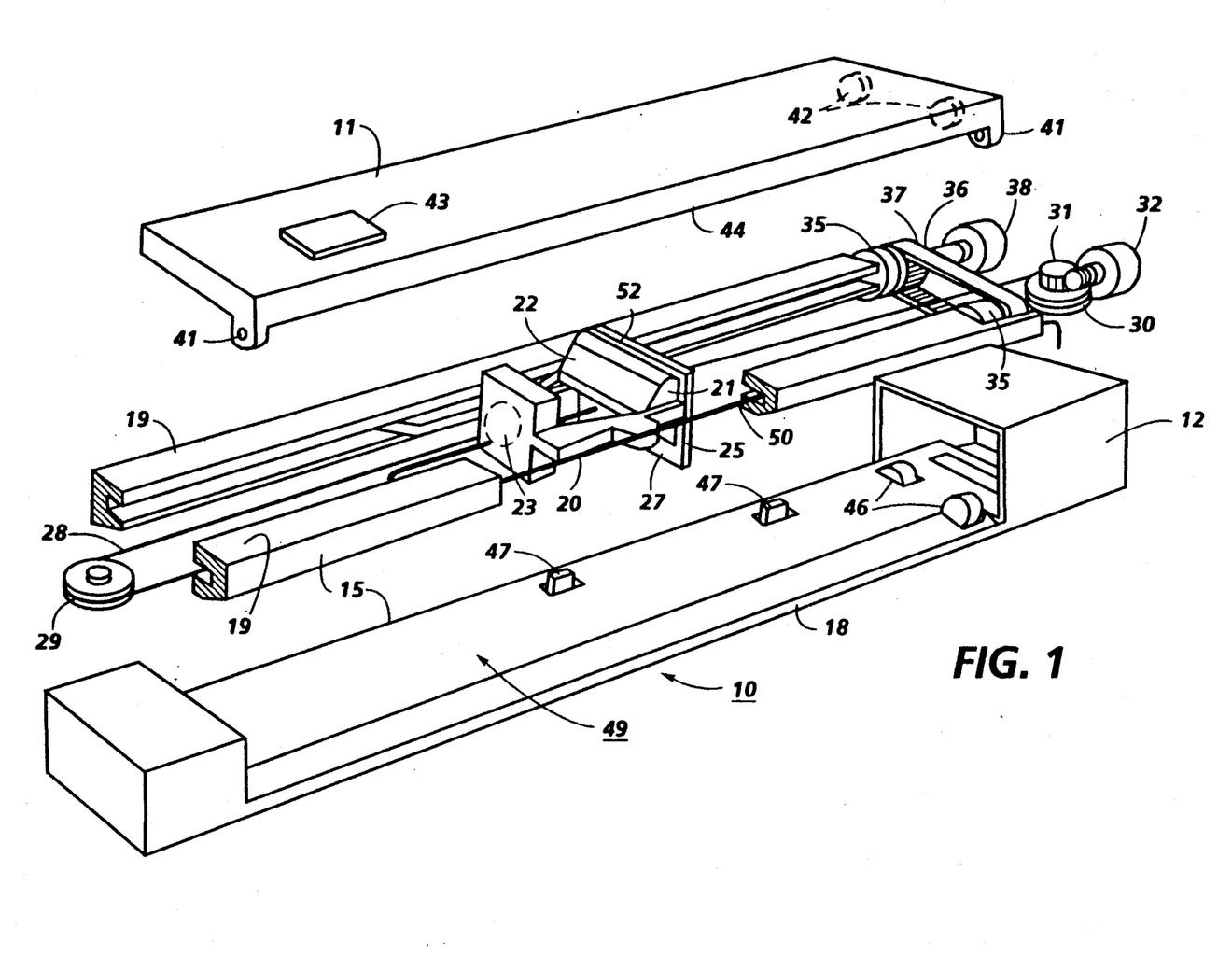
FIG. 1 is an exploded isometric view of the compact copier according to the present invention.
Figure 2:
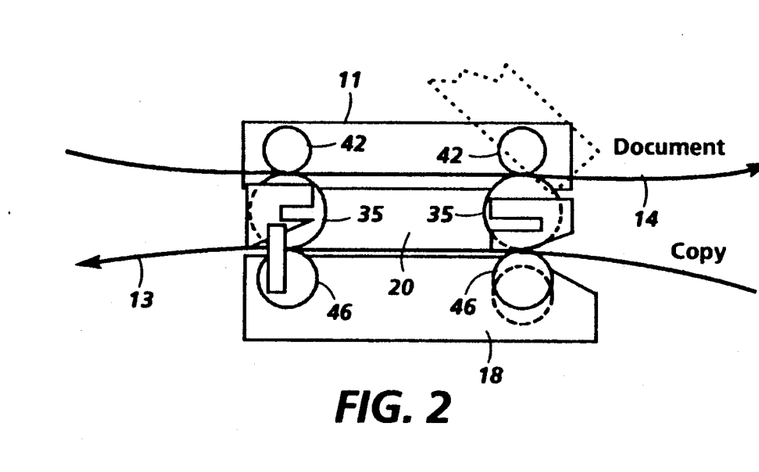
FIG. 2 is a schematic cross sectional view of the compact copier according to the present invention.
Figure 4:
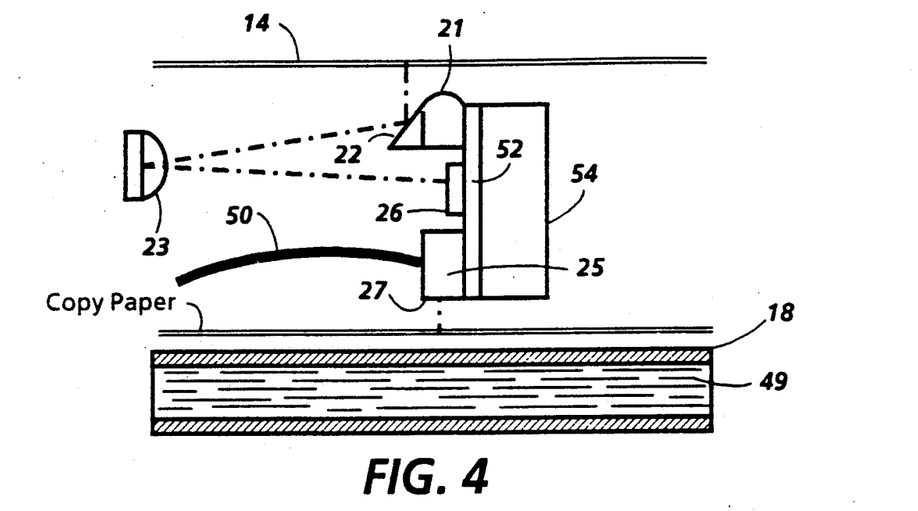
FIG. 4 is a sectional view along the line AA of FIG. 3 illustrating the elements of the scanning carriage in the present invention.

Referring to FIGS. 1, 2 and 4, of the drawings there is shown a combined input scanner and output scanner designated generally by reference 10. The scanner 10 includes a frame assembly 15 composed of a base unit 18, rails 19 within which scanning carriage 20 is transported during its scanning path. When not in scanning operation the scanning carriage 20 is parked in the maintenance station 12 where it is protected from contamination and maintained in a relatively constant environment.

The scanning carriage 20 includes an array of light emitting diodes 21 mounted to substrate 52 which is typically ceramic or planar plastic, and has a heat sink 54 built into its rear portion. Input and control chip 26 and ink jet chip 27 are comounted in the same plane to the same planer substrate 52. When assembled, the document can be scanned with the image being reflected by mirror 22 through half-lens 23 back to the input and the control chip which can essentially simultaneously activate the ink jet chip 27. By this arrangement which enables the input chip and the ink jet chip to be mounted on the same planar substrate, mechanical tolerance requirements can be substantially reduced. This configuration also enables the input chip and ink jet chip and possibly all control chips to be combined into a single chip. This assembly scans or reads document originals 14 the image area being converted to electric image signals or pixels. The image signals generated by the reading head are input to a print bar 25 which may be any suitable direct imaging device such as a thermal transfer head or preferably a thermal ink jet array 27 to write copies of the document originals in accordance with the image signals onto a suitable substrate or copy sheet 13. It will be understood that the number of scanning elements or sensors that comprise the image read bar 17 determine the initial scanning resolution while the number of ink jet nozzles 25 that comprise the print bar 25 determine the resolution of the image copy. In a preferred embodiment the number of input scanning elements equals the number of output printing elements. Both the scanning head and the print head are secured for movement on scanning carriage 20 which is mounted for forward and backward bi-directional scanning movement in a scanning path along the length of the frame assembly by means of scan stepper motor 32 through gear 31 pulleys 29 and 30 and cable 28 to move the scanning carriage in the rails 19.

Figure 7:
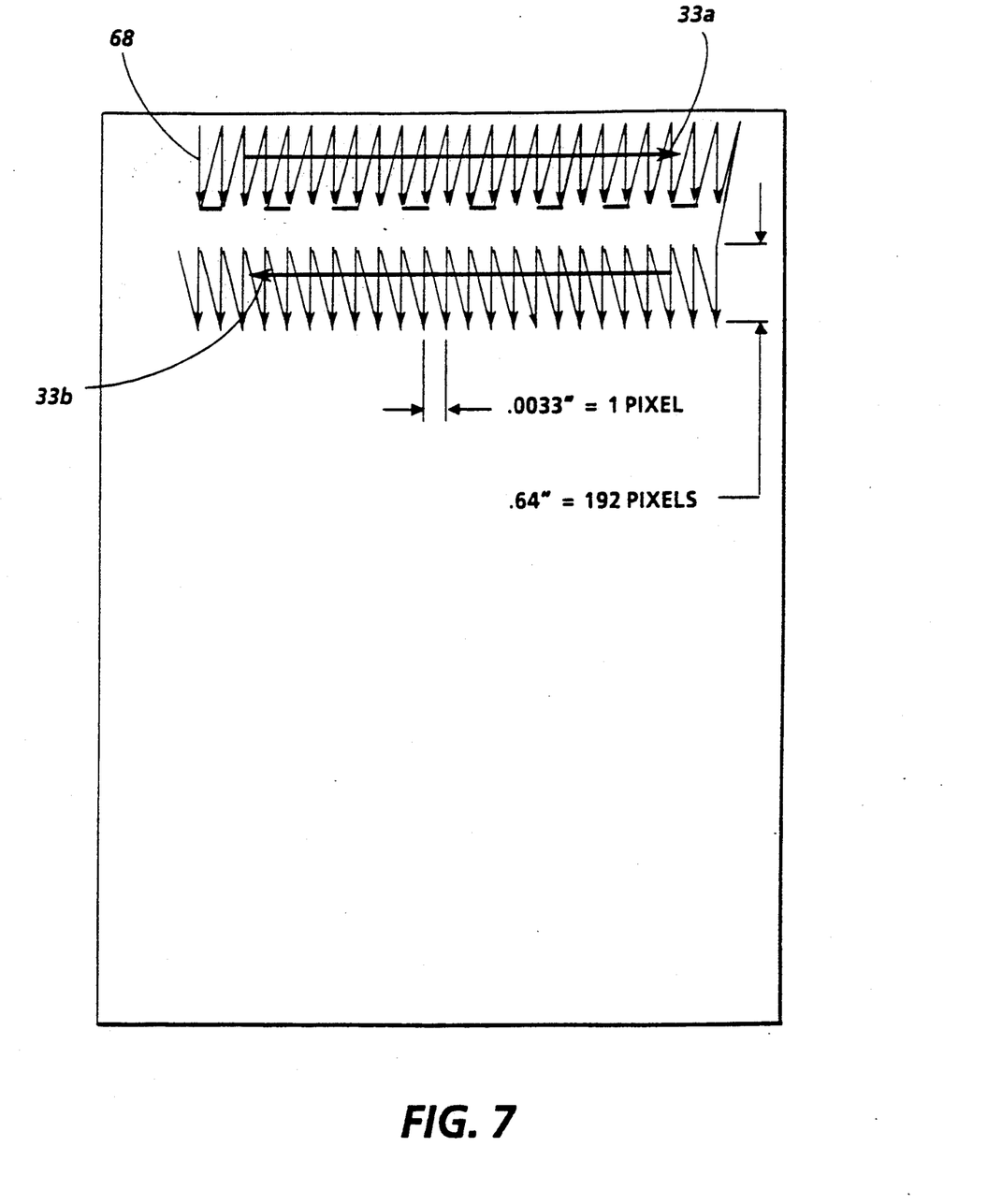
FIG. 7 is an illustration of the scanning operation.
Figure 8:
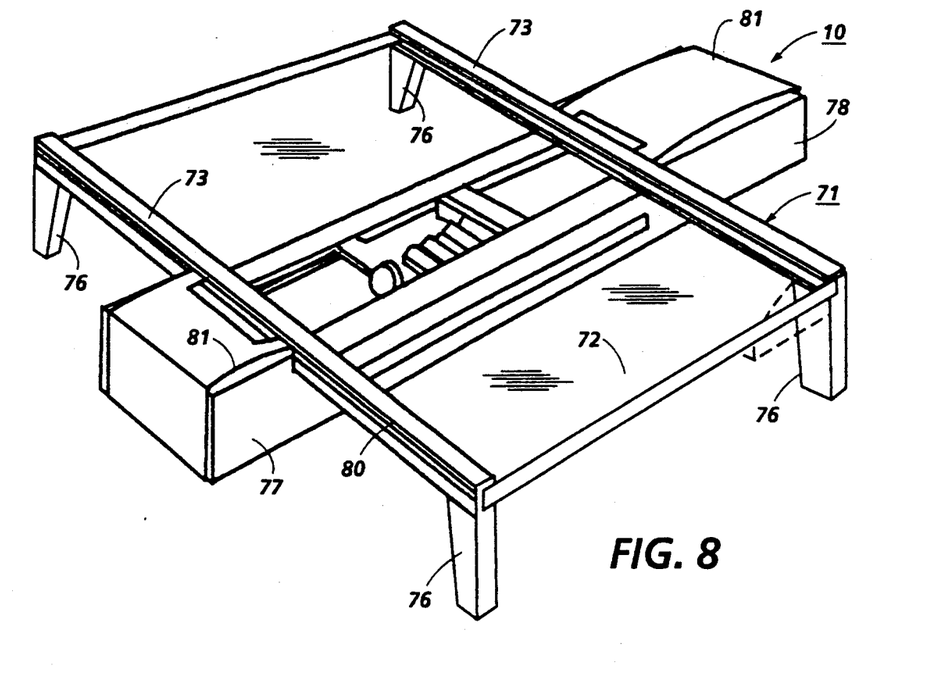
FIG. 8 is an isometric view of one embodiment of the platen accessory according to the invention with a portable compact copier movably mounted thereto.

The movement of the scan carriage 20 supporting image read assembly 21, 22, 23, 26 and print bar 25 is further illustrated with respect to FIG. 7. Arrows 33a and 33b illustrate the forward and reverse scan of the carriage 20 across a document and copy sheet, also shown in FIG. 2. The arrows 68 illustrate that a number of pixels, perpendicular to the direction of movement of scan carriage 22, are both read by the read assembly and printed by the print bar as the carriage scans the document and copy sheet. In a typical embodiment, 192 pixels at 300 per inch are read and printed perpendicular to the movement of carriage as it scans. In this example arrow 68 represents a band of information 0.0033 inch long and 0.64 inch wide which is read and printed. This enables scanning a band of information about 0.64 inches wide. The movement of the carriage can be continuous or in discrete steps, but in a preferred embodiment, the 192 pixels are read and printed in increments that are one pixel apart as shown. In one embodiment, each time the scan carriage moves a distance of one pixel width across the sheet, the electronic image of 192 pixels down the sheet are moved into a shift register and then amplified and shifted in reverse order into the print bar to fire the 192 ink jets and thereby create a print of the 192 pixels previously read. This sequence is repeated each time the scan carriage has moved a distance of one pixel width. It should be noted that the scanning could also be done with 192 parallel channels, each channel reading and writing a single line of pixels as the carriage sweeps across the page. While it is preferred that the read/write operation be substantially simultaneous it should also be noted that a digital buffer or register could be incorporated to initially store the scanned or read signals for later printing after a predetermined or arbitrary time period. It should also be understood that the combined scanner illustrated has multimode capability and could be operated independently as a printer modulated by any suitable device providing digital information, operated independently as a scanner to convert source documents to a digital representation, or operated as a facsimile device using the reading and printing elements when combined with a suitable modem, or operated as a copier by combining the scanning and printing operations.

Figure 3:
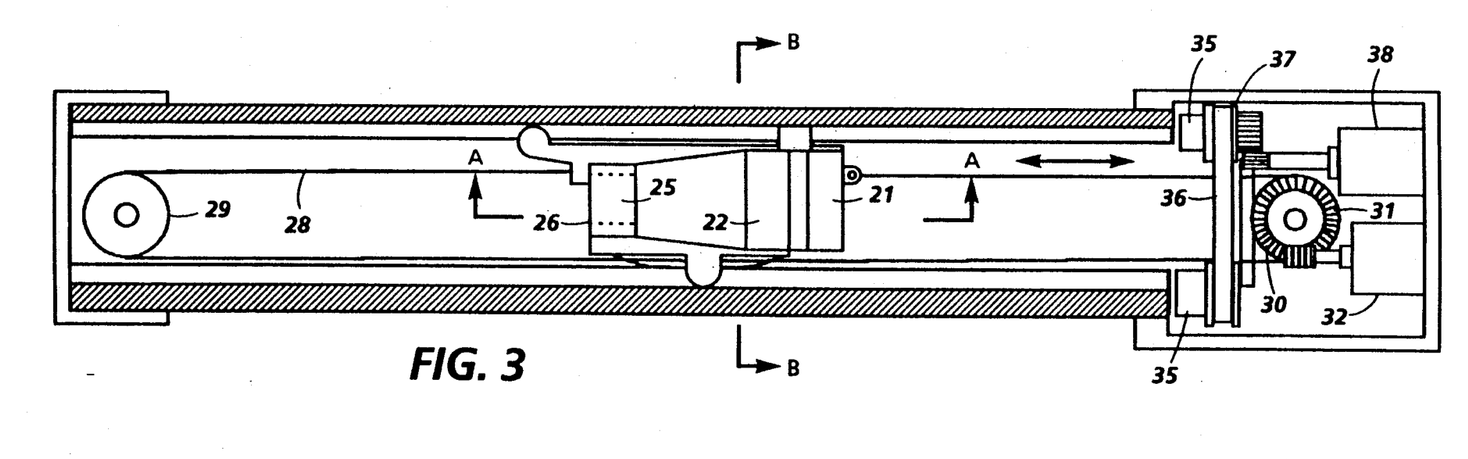
FIG. 3 is a plan view illustrating the scanning carriage system.

Following a scanning run in either direction across the length of the frame assembly the document and copy sheet are each indexed through the scanner in opposite directions a distance equal to the width of the band of information on the document scanned by the reading head which is the same as the width of the band of information printed on the copy sheet by the printing head. This width can be any width from a minimum of a single pixel line to a maximum of the width of the entire document. In practical terms, however, in order to keep the cost of the read and write components low the width of the band is of the order of a fraction of an inch to several inches wide. The method for achieving this is illustrated with further reference to FIGS. 1, 2, and 3, wherein an indexing means is provided at one end of the frame assembly comprising a pair of synchronously driven rotatable drive rolls 35 forming a feeding nip for a document with document feed idler rolls 42 contained within the top cover 11 of the scanner. The term synchronously driven is intended to define only that the drive rolls 35 are synchronized to each other. The drive rolls 35 also form a feeding nip for a copy sheet with the copy sheet idler rolls 46 in the copy sheet with the copy sheet idler roll 46 in the copy sheet transport path. The drive rolls 35 are driven by index motor 38 through pulley gear 37 and belt 36. The scan stepper motor 32 and the index stepper motor 38 are controlled by logic 33 as illustrated in FIG. 4.

Figure 5:
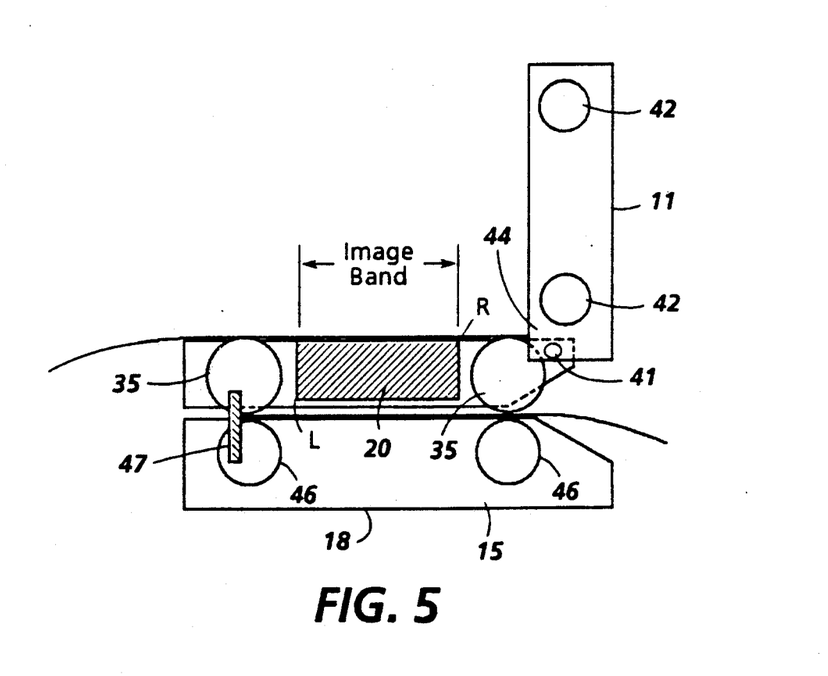
FIG. 5 is a sectional view taken along the line BB in FIG. 3 illustrating the registration mechanism for the document as well as the copy sheet according to the present invention.

With additional reference to FIG. 5, the top cover 11 is pivotally mounted to the frame assembly 15 and in particular the base unit 18 pivots about points 41. When the top cover is pivoted to the open position the document feed idler rolls are disengaged from the drive rolls and the registration edge 44 is inserted into the plane of the document transport path enabling the placement of a document to be copied in the scanner with its lead edge registered and inhibiting transport of the document through the document transport path. In a similar manner the copy sheet idler rolls 46 in the base unit are retracted from engagement from the drive rolls 35 by linkage (not shown) when the top cover is raised to the open position. Similarly, the registration gates 47 are inserted into the copy sheet transport path to enable manual registration of the copy sheet.

In a preferred embodiment the circumference of the drive rolls is equal to the width of the band of information across the document scanned by the scanning carriage to eliminate run out and shaft straightness tolerance defects which otherwise might cause some misregistration between scan widths.

As further illustrated in FIG. 4 the base unit 18 has ink supply 49 connected to the ink jet print head 27 by means of a flexible umbilical ink supply tube 50. While the scanner of the present invention may have power supplied by conventional connection to household electrical circuit FIG. 1 illustrates a preferred embodiment wherein a rechargeable battery 43 is contained within the top.

In normal operation when the top cover is opened the idler rolls in the document path which are mounted in the top cover are moved out of position enabling placement of the document against front registration edges which is part of the top cover assembly. Opening the top cover also causes the first incoming copy paper idler roller to disengage from its drive roller and a set of registration fingers in the copy paper path to move into the copy paper path. A copy sheet may be inserted from the right until its lead edge contacts the registration fingers and a document may be inserted from the left on the top of the scanner face down. Following insertion of the copy sheet and the document the top cover is closed thereby reengaging both the copy paper and document idler rolls with the drive roll. In addition, the copy paper registration fingers are withdrawn, two sensors (not illustrated) detect that both the document and the copy paper have been loaded accordingly and the logic initiates the copying sequence. The scan carriage containing the read and write head disengages from the maintenance station and scans across the document and copy sheet while both remain stationary. The document is positioned so that is lead edge coincides with the right side pixel of the read head, and the copy paper is positioned so that its lead edge coincides with the left side pixel of the print head. This enables the formation of a right reading image in the copy sheet. A line of information on the document read on the right extreme of the image read head fires the print head on the extreme lift of the printing array during the scan of the carriage 20. This may be illustrated with reference to FIG. 5. The pixel data received by the input chip at the extreme right of the chip (R); as the carriage 20 moves in the direction into and out of the paper is transmitted and amplified to modulate the print head to fire the print head at the extreme left (L) of the print head. This scheme enables the printing or right reading copies with essentially simultaneous reading and writing without information storage. As the carriage scans across both the document and the copy paper, the 0.64 inches band of information being read off the document is immediately printed onto the copy paper. When the first scan is complete the carriage motion stops. Both the document and copy paper are then indexed in a direction transverse to the scanning direction the width of the band of information previously scanned. This indexing is accomplished by driving the single pair of drive rolls which engage the document at the 12:00 position with the document feed idler rolls forming a feeding nip therebetween, and the copy paper at the 6:00 position with the copy sheet feed idler roll forming a feeding nip therebetween. The clockwise motion of the drive rolls of one revolution causes a document to be indexed 0.64 inches to the right and the copy paper to be indexed 0.64 inches to the left. In this way the second band of information from the document is moved into a position over a scan carriage and a second portion of the copy paper is moved to a position under the print head. The scan carriage scans across the document and copy paper in the reverse direction from the first scan again reading the document and immediately printing the copy. This sequence is repeated until the entire document is read and the entire copy is printed after which time the print head returns to the maintenance station and is parked. After the last scan across the document and copy paper is completed, the index motor is activated to eject the trial edge of the document to the right and the copy to the left after which the scanner returns to to the dormant state until the top cover is again opened and closed to reinitiate the next copy sequence.

Turning now to FIGS. 8 to 13D the attachable platen and portable copier concept according to the present invention will be described in greater detail. The platen accessory 71 includes document support member 72 which typically is a transparent imaging platen made from glass or plastic. The platen accessory has a pair of spaced parallel copier transport rails 73 running along two sides of the document support member. The platen accessory is provided with legs 76 which may be firmly attached to the copier transport rails or may be detachable or pivotally mounted to enable compactness in storage. The parallel copier transport rails have groves 80 along their longitudinal length. The portable copier is suspended from the bottom of the platen accessory by means of two leaf spring clamps 81 one of which is wrapped around the inboard side 77 of the portable copier, the other of which is wrapped around the outboard side 78 of the portable copier and the ends of which are inserted into the groves 80. In this geometry a document support platform has been substituted for the document transport mechanism whereby the top cover 11 of the portable copier illustrated in FIG. 1 may be removed upon which the top surface of the drive rolls are exposed. The leaf springs lift the portable copier until the document drive rolls 35 contact the drive surface 74 on the under side of the copier index rails 73. Following removal of the top cover from the portable copier a modular LED array 82 and a 45° mirror 83 are added to modify the optical path by moving the focal point to the top surface of the document support member when using the portable platen.

Figure 9:
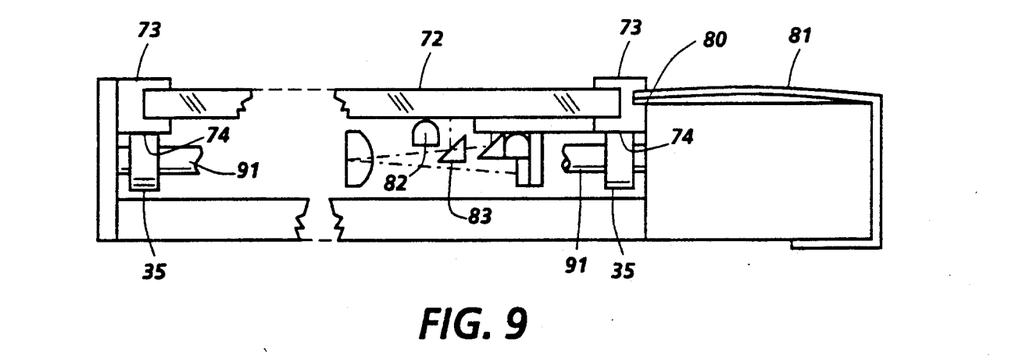
FIG. 9 is a partial view in cross section of the platen accessory and compact copier.
Figure 10:
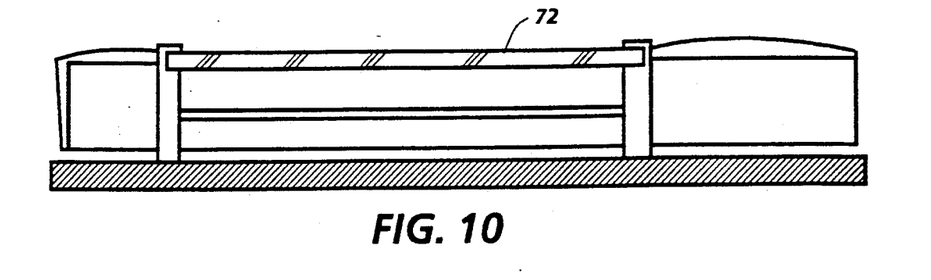
FIG. 10 is an end view of the platen and compact copier.

In operation the top cover 11 of the portable copier is removed together with the doourment feed idler rolls 42, the legs on the platen accessory are attached or folded down it being noted that the legs need to be long enough to provide a clearance between the bottom of the copier and the top of the support table as illustrated in FIG. 10. The auxiliary optical module consisting of the second LED array and a second 45° mirror is snapped or inserted into place. The leaf springs are snapped on to the inboard and outboard side of the portable copier and the ends of the leaf spring are inserted into the grooves 80 in the copier transport rails 73 to suspend the copier below the document support member. The leaf spring clips lift the entire copier in order to provide driving contact between the top portion of the drive rolls 35 and with the drive surface 74 at the bottom of the index rails attached to the document support member. Scanning of the document on the document support member across the width of the document by the scanning carriage is accomplished in the same manner as with the portable copier, the difference being after each scanning pass across the document rather than the drive roll indexing the document in a direction transverse to the scanning direction, the drive rolls index the portable copier relative to the document support member. Drive rolls 35 index the entire copier a distance equal to the width of the band of information across the document scanned by the scanning carriage to position the copier to expose the next band of information on the document. As illustrated in FIG. 9 a second drive mechanism is provided on the inboard side of the portable copier including a drive roll 35 driven from the same shaft 91 that the drive roll on the outboard side of the copier is driven. These drive rolls are in contact with drive surfaces 74 of the parallel transport rails 73.

Figure 11A:
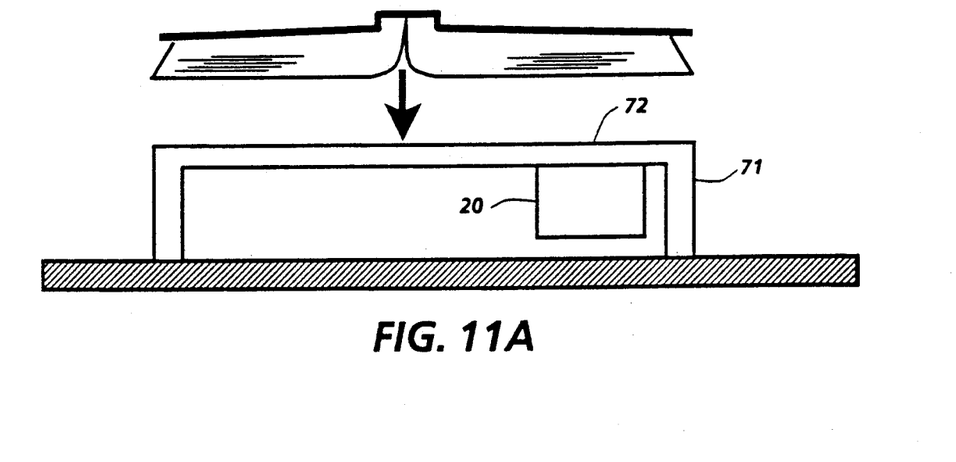
FIGS. 11A, 11B, 11C, 11D illustrate four different stages in the copy sequence of copying from a book.
Figure 11B:
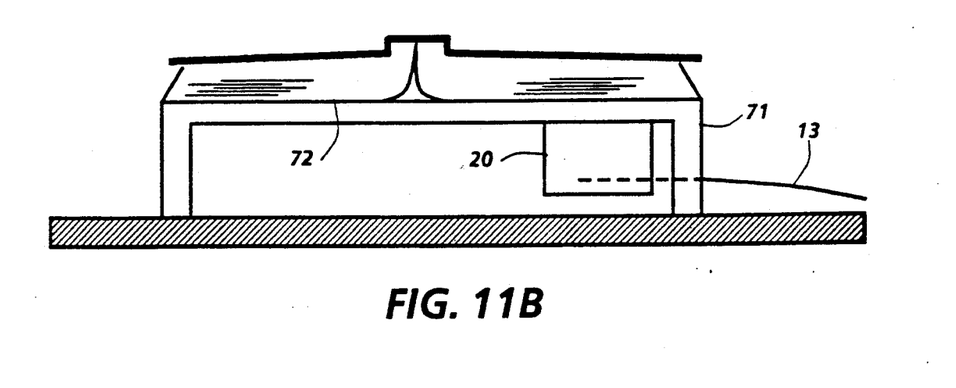
Figure 11C:
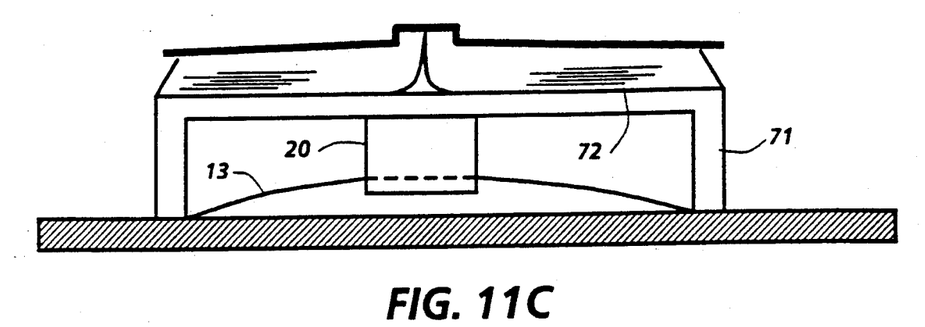
Figure 11D:
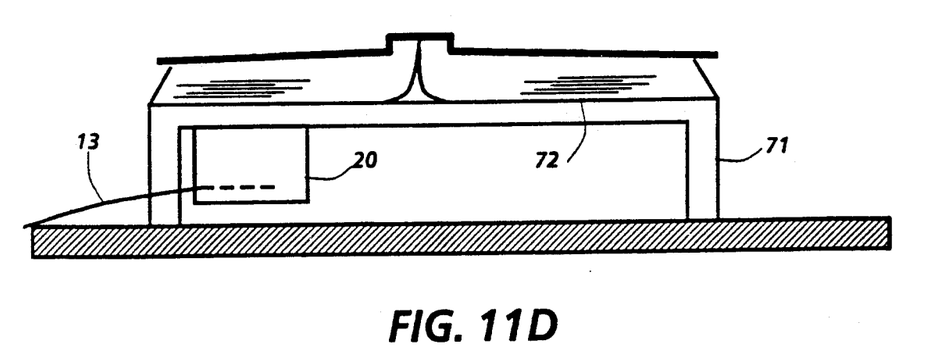
Figure 12:
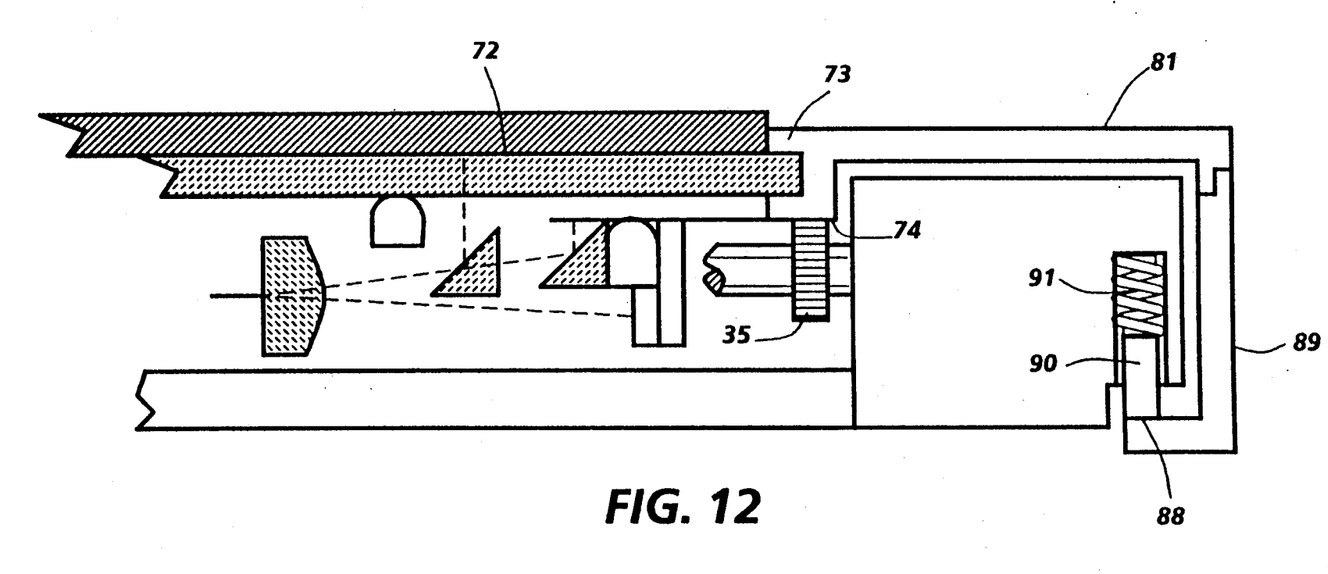
FIG. 12 is a partial view in cross section of another embodiment for mounting the copier to the platen accessory.

FIGS. 11A, 11B, 11C, and 11D illustrate the book copying operation. In FIG. 11A a book is placed on the platen 72, and the copying sequence is initiated in FIG. 11B by the insertion of a copy sheet 13 into the portable copier 10. After the scanning carriage 20 completes scanning a band of information from the book on the platen the copier and the copy paper are both indexed to the left as seen in FIG. 11C. When the copying sequence is completed, FIG. 11D, the copier has indexed itself to the left most position on the platen and the completed copy 13 extends to the left from the portable copier. The portable copier may then be moved to the rightmost position, FIG. 11A, in preparation for the next copy.

Figure 13A:
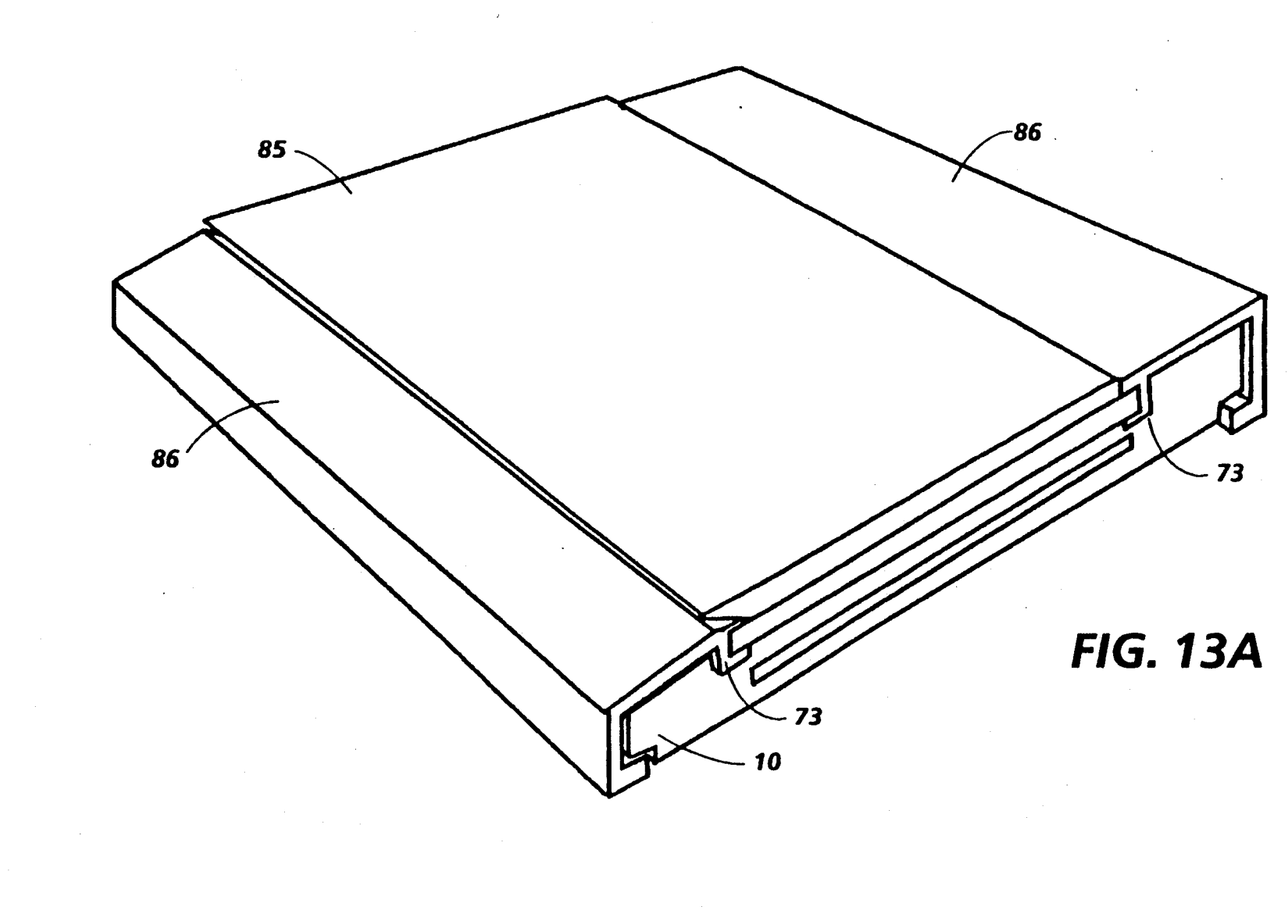
FIGS. 13A, 13B, 13C, 13D, are isometric representations of the platen accessory and the compact copier at different times in their use.
Figure 13B:
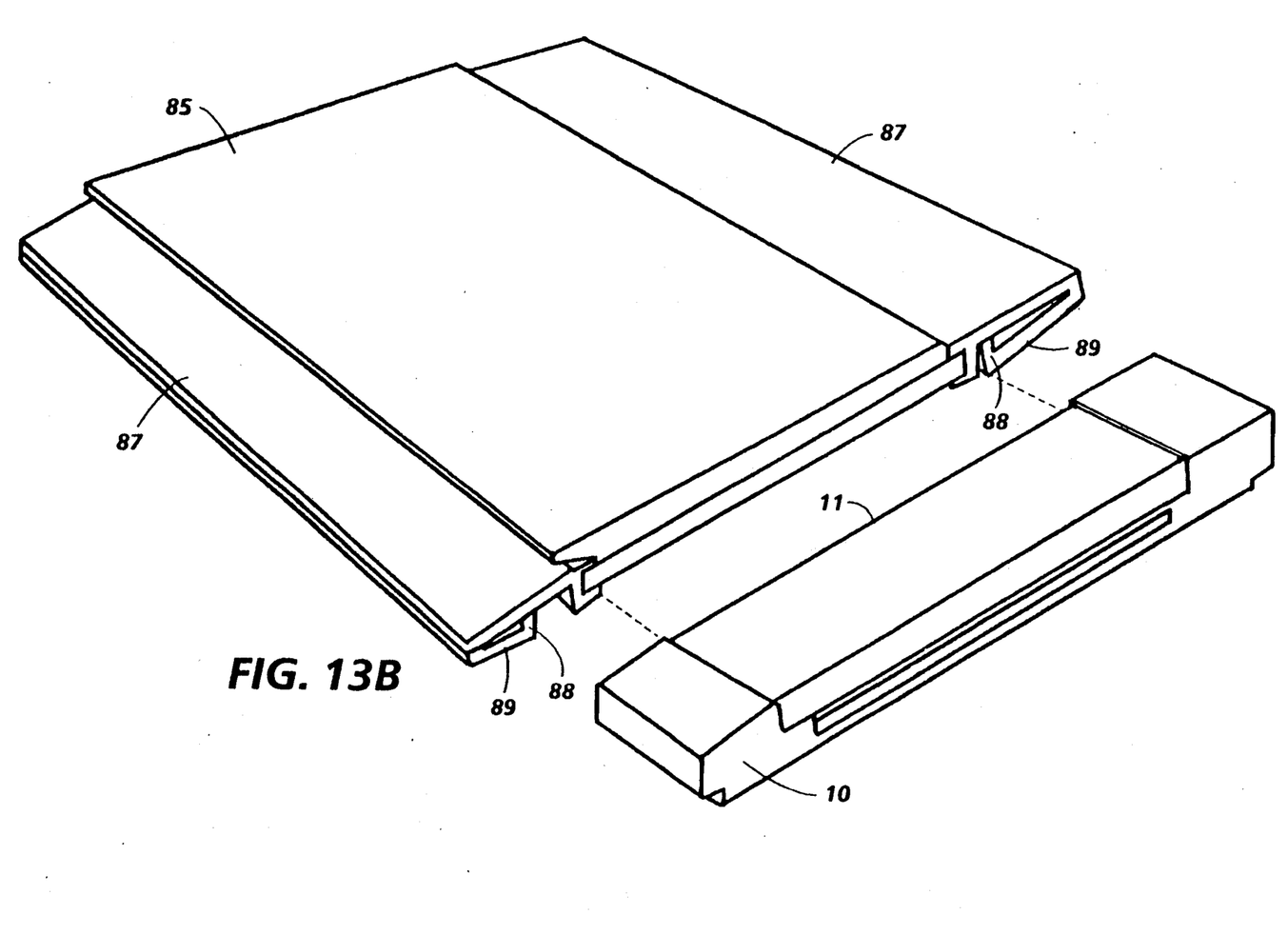

Attention is now directed to FIGS. 12, 13A, 13B, 13C and 13D wherein an alternative embodiment of the present invention if illustrated. This embodiment has the additional advantage that the ends of the portable copier are covered so that a large document such as a bound document which may extend over the edge of the document support member when placed on the detachable platen will not be in interference with the movement of the inboard side or outboard side of portable copier thereby interfering with the indexing accuracy and creating sticking errors. As illustrated in FIG. 13A a longitudinal support cover 86 may be provided adjacent to each of the parallel copier index rails 73 to enclose the portable copier. Alternatively, as seen in FIG. 13B, C this longitudinal support cover may be comprised of two sections a top cover 87, and a foldable mounted side portion cover 89 having copier support rails 88 attached thereto. In addition, an idler roll 90, See FIG. 12 in the base of the copier is spring loaded by spring 91 to press against the rails 88 which may be molded into the side cover 89 to create the upward normal force between the drive rolls 35 and the copier index rails 73 drive surface 74 on the copier index rails 73 adjacent document support member 72.

Figure 13C:
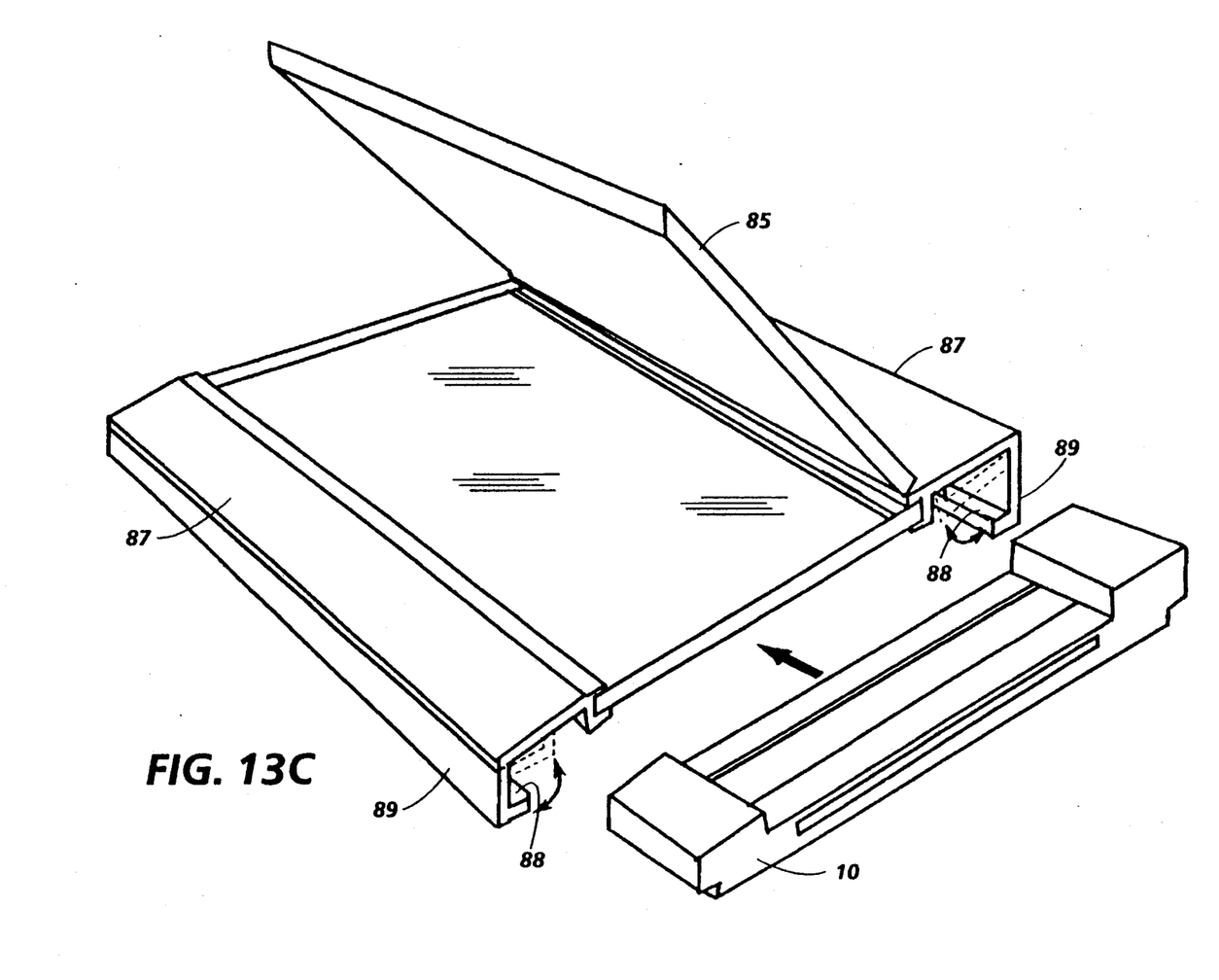
Figure 13D:
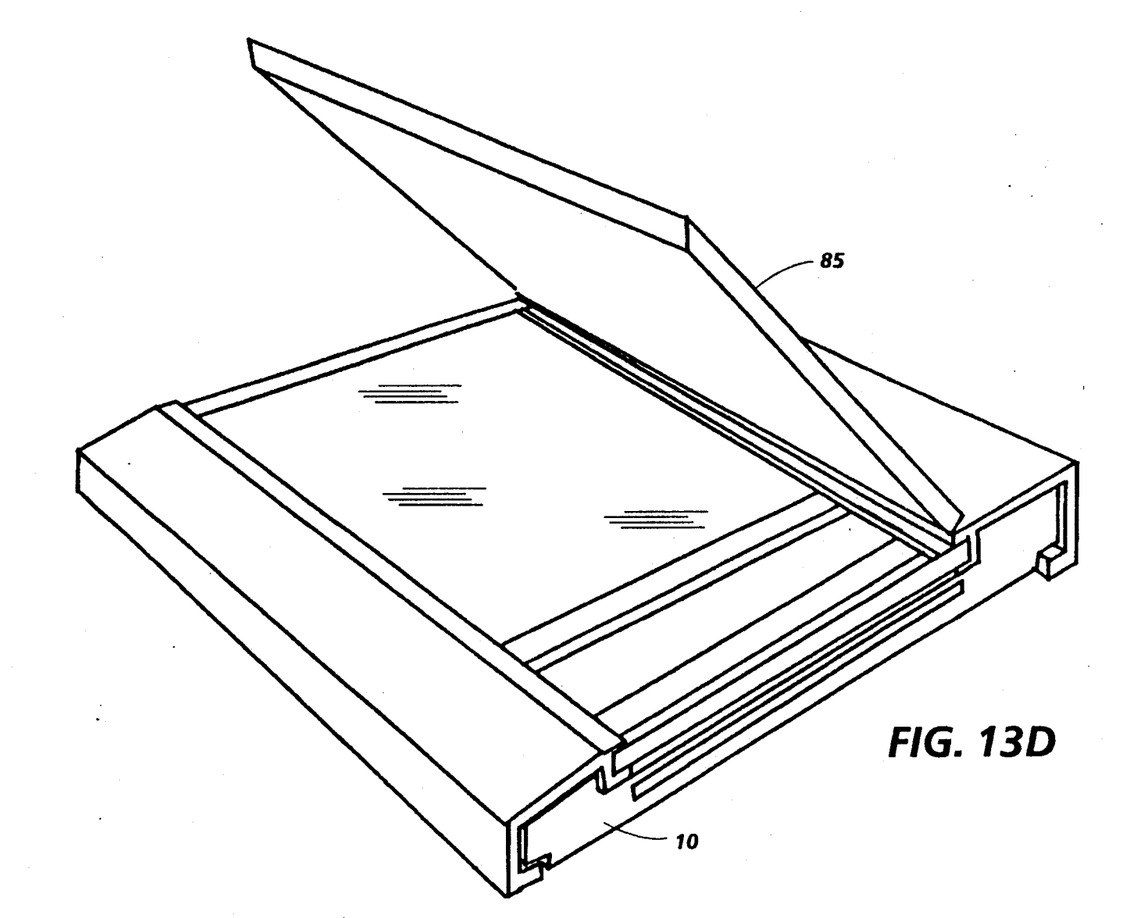

In operation the covers which may be folded up for portability and compact storage (See FIG. 13B) are folded down for copying and the top cover 11 of the portable copier is removed (See FIG. 13C). The portable copier is simply inserted into the open end of the platen accessory as in the previous embodiment (See FIG. 13D). When a sheet of copy paper is inserted in the appropriate slot the copier indexes itself and copy paper down the length of the platen in steps equal to the width of one print band. As illustrated in FIGS. 13A–D in order to prevent dark borders, a platen cover 85 can be provided in either embodiment. Typically the platen cover is pivotally mounted for movement between an open position and a closed position and has an opaque light reflective surface.

Thus, according to the present invention a portable platen accessory for a portable copier has been provided which enables the user to not only be able to reproduce cut sheet documents, but to be able to copy from books and magazines at remote locations on the spot. Further the reproducing apparatus is compact, efficient, and economical.

All the patents and other references together with the cross referenced copending applications are hereby specifically and totally incorporated in their entirety into this specification.

While the invention has been described with references specific embodiments thereof it will be apparent to those skilled in the art that many alternatives modifications and variations may be made. For example, will the invention as been described with reference to indexing the portable copier on the transport rails for successive scans of bands of information it will be understood that it applies equally to a single scan copier with full width reading and printing arrays. Accordingly it is intended to embrace all such alternatives and modifications as may fall in the spirit of the appended claims.

I claim:

1. A platen accessory for a portable copier not having a platen comprising a transparent document support member, a pair of parallel copier transport rails mounted to said document support member defining a portable copier transport path across said document support member, said rails having a drive surface for engagement with a drive mechanism on a portable copier to transport the copier along the drive surface and means to movably mount a portable copier to said platen accessory.

2. The platen accessory of claim 1 wherein said drive surface is on the bottom of said rails and said document support member is supported by legs of sufficient length that a portable copier can be freely indexed along the drive surface on the bottom of said rails.

3. The platen accessory of claim 2 wherein said legs are foldably mounted to said rails.

4. The platen accessory of claim 2 wherein said legs are removably mounted.

5. The platen accessory of claim 1 including an opaque light reflective cover pivotally mounted for movement between an open and a closed position on said document support member.

6. The platen accessory of claim 1 wherein said means to mount comprises a pair of parallel groves, one in each of the parallel rails.

7. The platen accessory of claim 1 wherein said means to movably mount a portable copier comprises a longitudinal support cover means adjacent each of said index rails to cover portions of a portable copier when inserted therein and to support a portable copier as it is transported along said rails in a transport path.

8. The platen accessory of claim 7 wherein said longitudinal support cover comprises a first top cover to cover the top portions of a portable copier and to minimize interference with a document extending beyond the document support member being copied as said portable copiers is transported along said rails in the transport path.

9. The platen accessory of claim 8 wherein said longitudinal support cover further includes at least one portable copier support member for supporting a portable copier in its path, said copier support member including means to urge the drive mechanism of a portable copier into driving engagement with the drive surfaces of said rails.

10. The platen accessory of claim 9 wherein each of said copier support members is pivotally mounted to a support cover.

11. The platen accessory of claim 9 wherein each of said copier support members is fixedly mounted to a support cover.

12. Reproducing apparatus comprising a portable imaging platen, a self contained portable copier not having a platen but having a scanning carriage adapted for scanning movement, said scanning carriage having a reading head secured thereto for scanning a document to produce a digital image and a printing head secured thereto for printing said digital image on a copy sheet, said portable platen having a transparent document support member, a pair of parallel copier transport rails mounted to said document support member defining a portable copier transport path across said document support member, said rails having a drive surface, said portable copier being mounted on said transport rails and having a drive mechanism for transporting said portable copier along said drive surface of said rails.

13. The apparatus of claim 12 wherein said drive mechanism includes means to index said portable copier along its transport path a distance equal to the width of a band of information scanned by said carriage.

14. The apparatus of claim 12 wherein said drive surface is on the bottom of said rails and said document support member is supported by legs of sufficient length that a portable copier can be freely transported along the drive surface on the bottom of said rails.

15. The apparatus of claim 14 wherein said legs are foldably mounted to said rails.

16. The apparatus of claim 14 wherein said legs are movably mounted.

17. The apparatus of claim 12 including an opaque light reflective platen cover pivotally mounted for movement between an open and closed position on said document support member.

18. The apparatus of claim 12 wherein said portable copier has inboard and outboard sides adjacent said rails, each of said rails has a longitudinal groove, said portable copier being movably mounted to said rails and said drive mechanism being urged into driving engagement with the drive surface of said rails by means of leaf spring clip around each of said inboard and outboard sides of said copier and being supported in said grooves.

19. The apparatus of claim 12 wherein said portable copier has inboard and outboard sides adjacent said rails and said portable imaging platen includes longitudinal support cover means adjacent each of said rails to cover said inboard and outboard sides of said portable copier and to support said portable copier as it is transported along said rails in a transport path.

20. The apparatus of claim 19 wherein said longitudinal support cover comprises a first top cover to cover the inboard and outboard sides of the portable copier and to minimize interference with a document being copied on the document support member as said portable copier is transported along said rails in a transport path.

21. The apparatus of claim 20 wherein said longitudinal support cover further includes a pair of parallel portable copier support rails for supporting a portable copier in its transport path;

22. The apparatus of claim 21 wherein each said copier support rail is pivotally mounted to a support cover.

23. The apparatus of claim 21 wherein said inboard and outboard sides of said portable copier have biasing means engagable with said copier support rails to urge said copier upwardly into driving engagement with the drive surface said copier transport rails.

24. The apparatus of claim 23 wherein said biasing means comprises at least one spring loaded idler roll on each of said inboard and outboard sides of said portable copier.

25. The apparatus of claim 12 wherein said portable copier has an inboard and outboard side and said scanning carriage is movably mounted in a copier frame assembly for scanning movement in a first direction between said inboard and outboard sides, said frame assembly including a copy sheet transport path including means to index a copy sheet through said copy sheet path in a direction transverse to said first direction, said means to index comprising a pair of synchronously driven rotatable drive rolls forming a feeding nip with a copy sheet feed idler roll and an indexing nip with said drive surface of said indexing rails.

26. The apparatus of claim 25 wherein the reading head scans a band of information across a document on said document support member and the printing head essentially simultaneously prints the same band of information across a copy sheet and upon completion of said scanning movement the indexing means indexes the copy sheet and the portable copier through their respective paths a distance equal to the width of said band of information before said carriage scans another band of information across the document.

27. The apparatus of claim 26 wherein the drive rolls have a circumference equal to the width of the band of information.

* * * * *